G. T. TRUNDLE.
FEEDING MECHANISM FOR CARDS, ENVELOPS, AND SIMILAR ARTICLES.
APPLICATION FILED JULY 5, 1913.
1,116,860.
Patented Nov. 10, 1914.
6 SHEETS—SHEET 1.
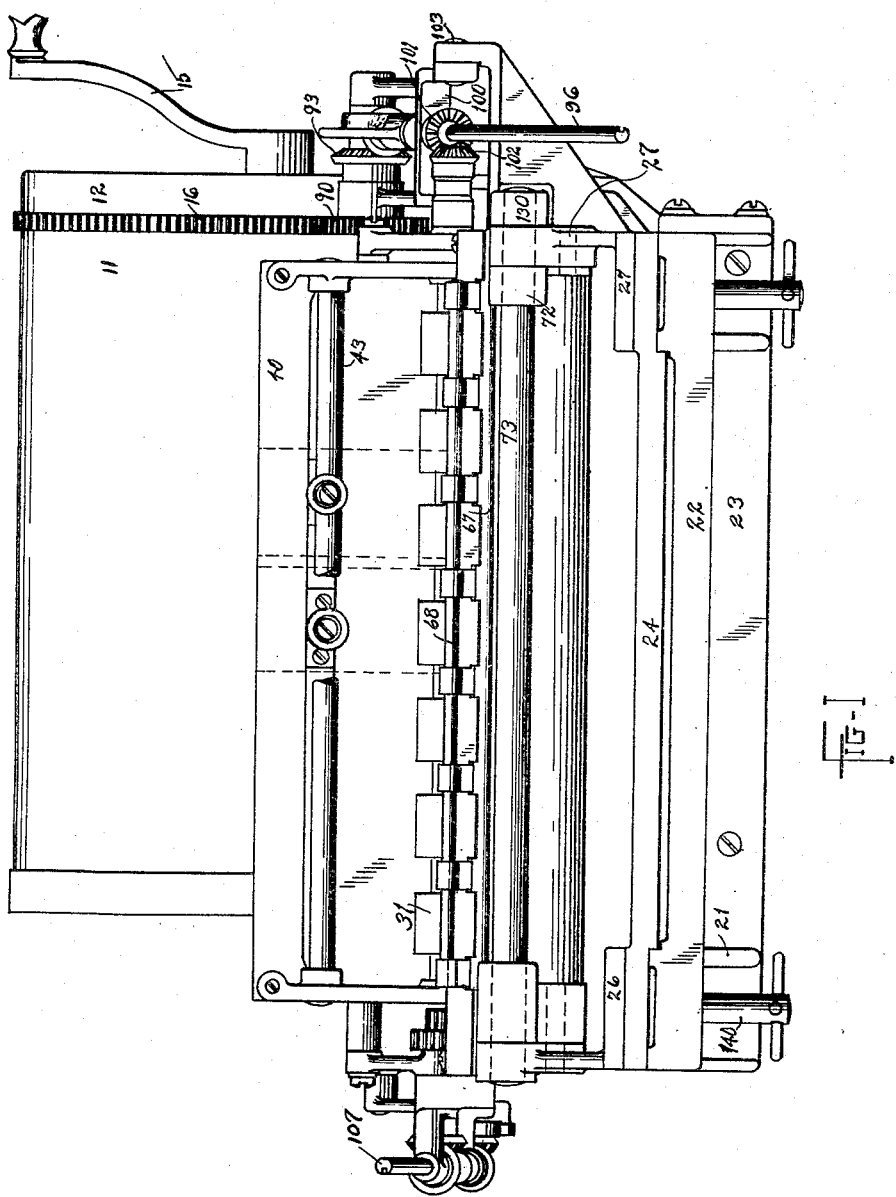

G. T. TRUNDLE.
FEEDING MECHANISM FOR CARDS, ENVELOPS, AND SIMILAR ARTICLES.
APPLICATION FILED JULY 5, 1913.
1,116,860.
Patented Nov. 10, 1914.
6 SHEETS—SHEET 2.
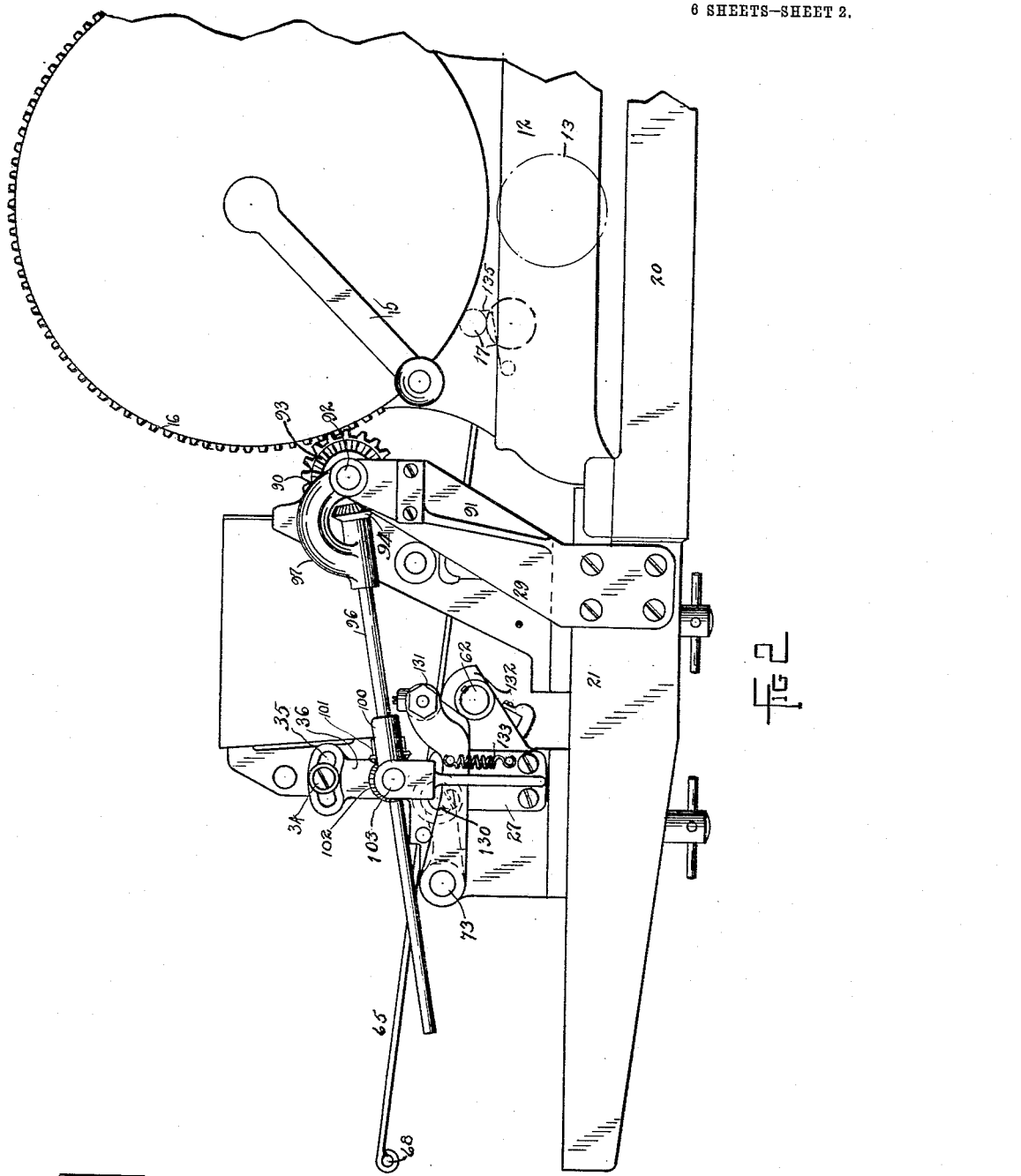

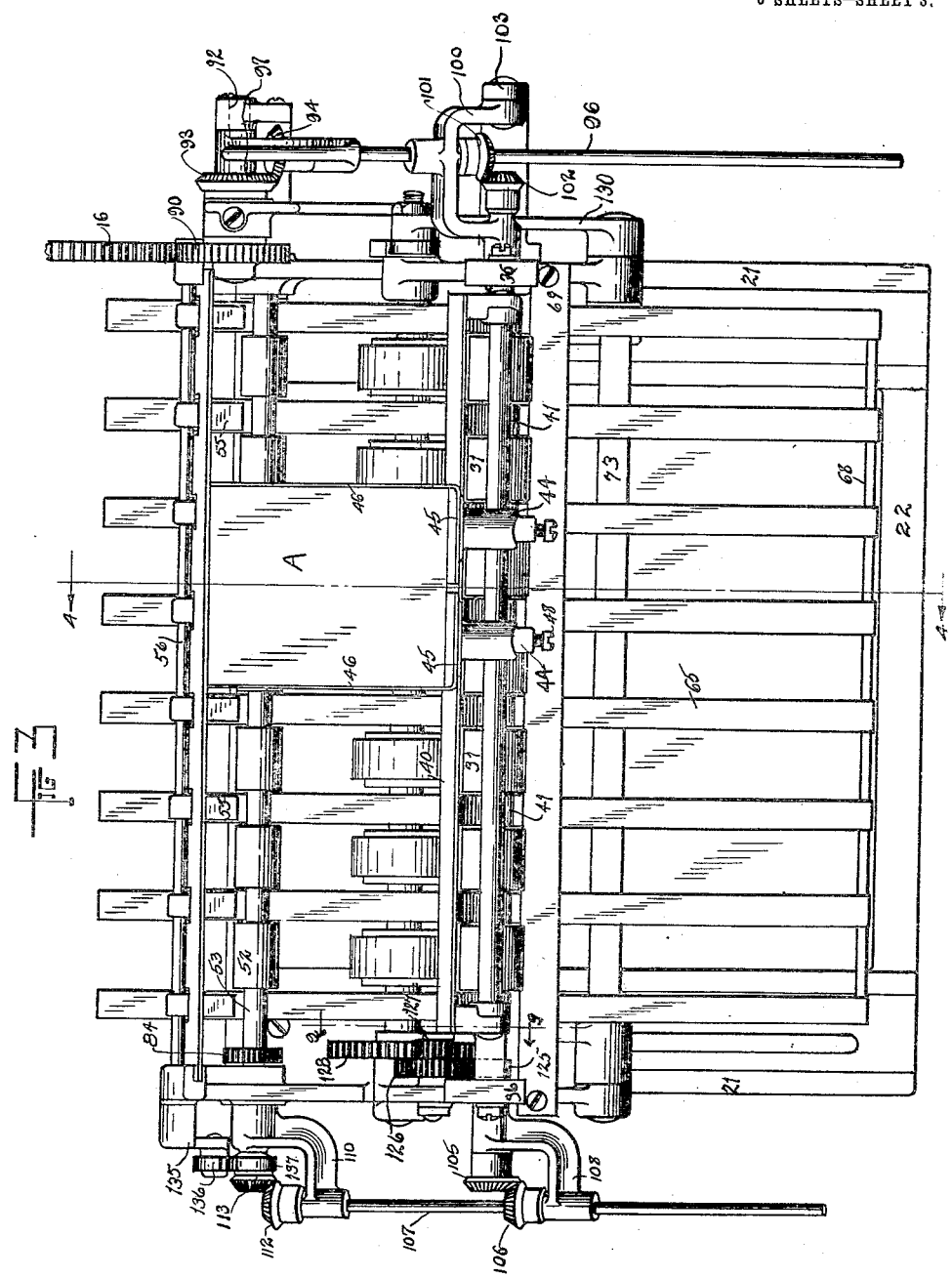

G. T. TRUNDLE.
FEEDING MECHANISM FOR CARDS, ENVELOPS, AND SIMILAR ARTICLES.
APPLICATION FILED JULY 5, 1913.
1,116,860.
Patented Nov. 10, 1914.
6 SHEETS—SHEET 4.
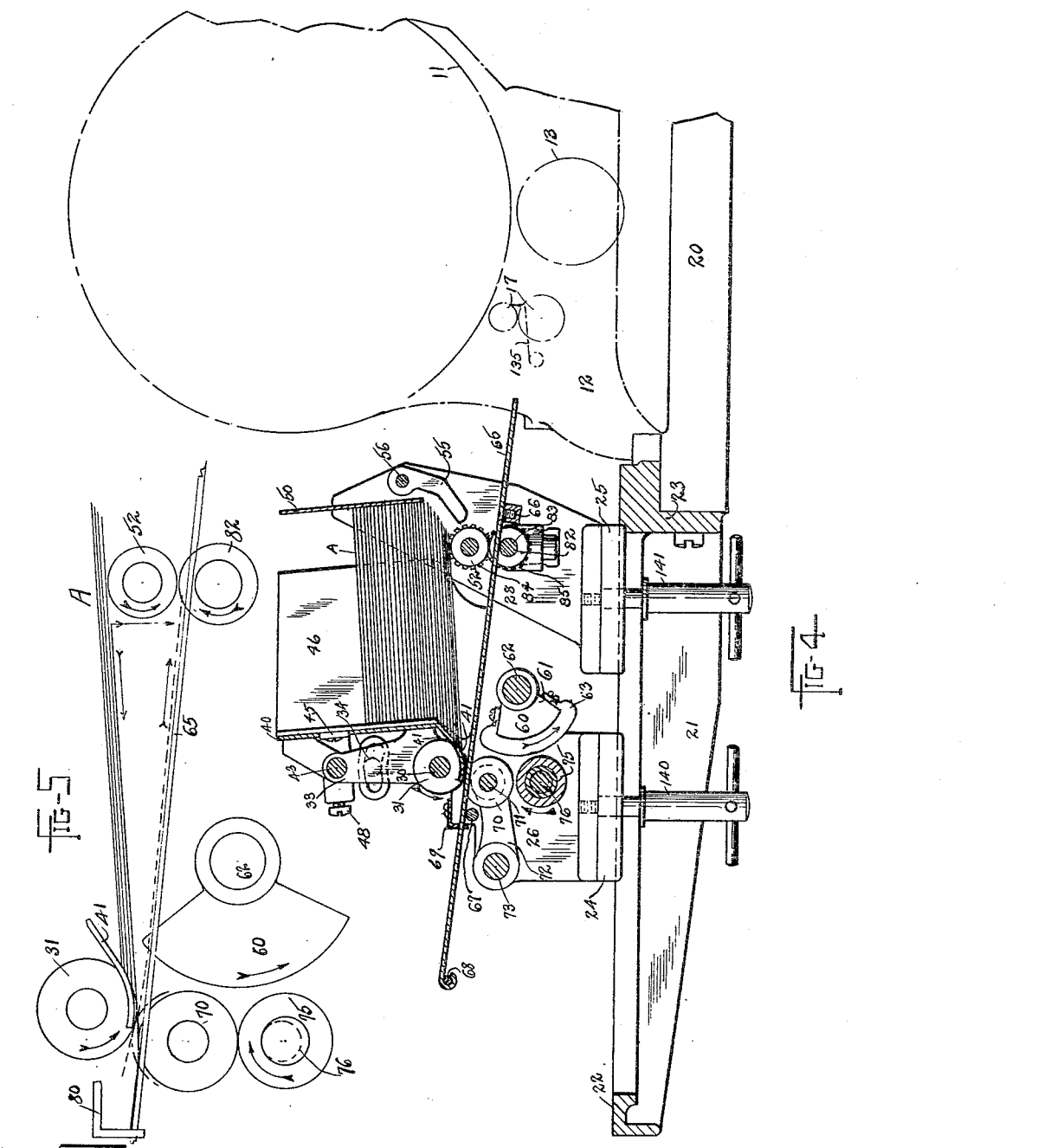

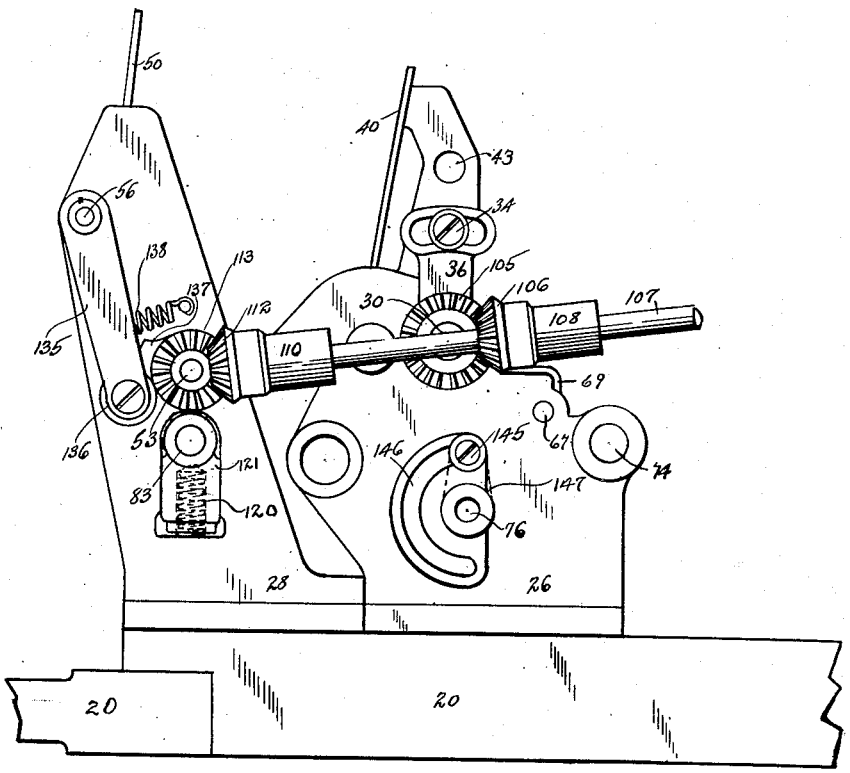

G. T. TRUNDLE.
FEEDING MECHANISM FOR CARDS, ENVELOPS, AND SIMILAR ARTICLES.
APPLICATION FILED JULY 5, 1913.
1,116,860.
Patented Nov. 10, 1914.
6 SHEETS—SHEET 6.
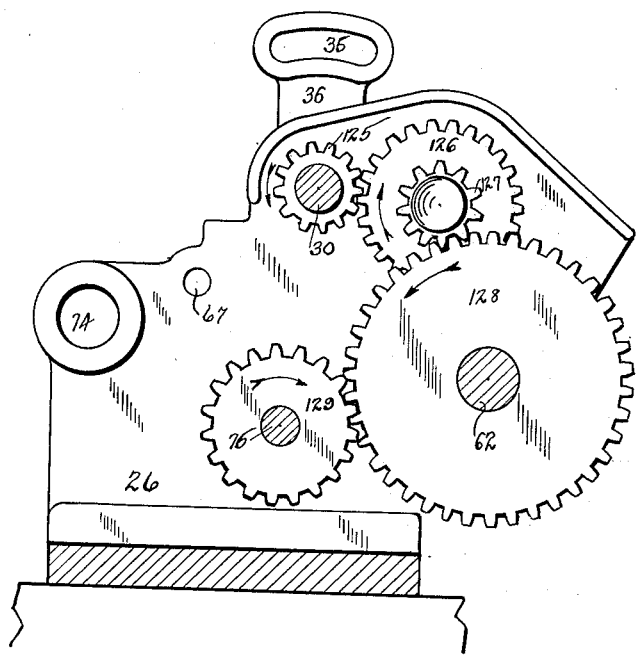
Fig-9
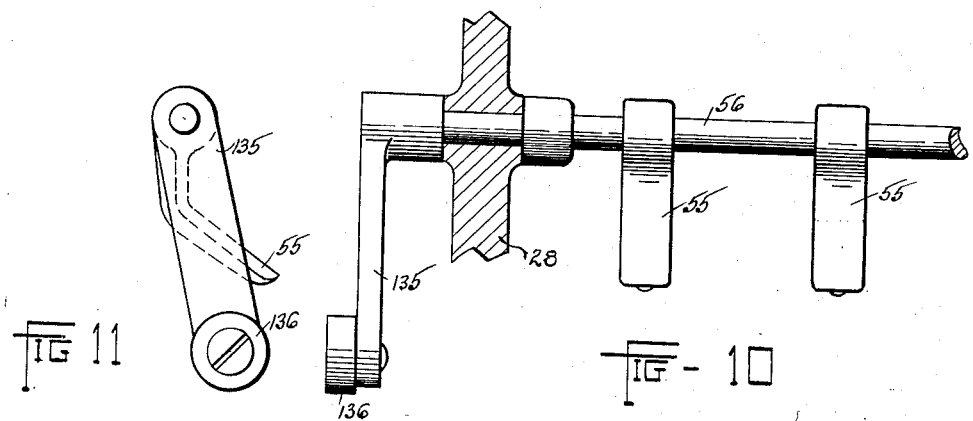
Fig 11
Fig-10
Witnesses
Geo. S. Johnston
Justin L. Macklin
Inventor
George T. Trundle
By Albert H. Bates
Atty

UNITED STATES PATENT OFFICE.

GEORGE T. TRUNDLE, OF CLEVELAND, OHIO, ASSIGNOR TO THE AMERICAN MULTIGRAPH COMPANY, OF CLEVELAND, OHIO, A CORPORATION OF OHIO.

FEEDING MECHANISM FOR CARDS, ENVELOPS, AND SIMILAR ARTICLES.

1,116,860.         Specification of Letters Patent.         Patented Nov. 10, 1914.

Application filed July 5, 1913. Serial No. 777,402.

*To all whom it may concern:*

Be it known that I, GEORGE T. TRUNDLE, a citizen of the United States, residing at Cleveland, in the county of Cuyahoga and State of Ohio, have invented a certain new and useful Improvement in Feeding Mechanism for Cards, Envelops, and Similar Articles, of which the following is a full, clear, and exact description, reference being had to the accompanying drawings.

The object of this invention is to provide simple and effective mechanism for feeding cards, envelops and similar articles of various weights, sizes and thicknesses with certainty and great rapidity.

To this end the invention consists of a peculiar system of rolls, guides and mechanism which coöperates to take the cards or envelops one after the other from a stack and carry them in one direction until freed from the stack, and then in the opposite direction for delivery. Before the latter movement is completed, the mechanism is adapted to engage and start the forward movement of another article. This enables great rapidity of operation.

My mechanism is hereinafter more fully described; it is illustrated in the drawings in a preferred form, and the essential characteristics are set out in the claims.

In the drawings, Figure 1 is a front elevation of my feeding mechanism associated with a rotary printing machine of the type known as the multigraph or Gammeter printer; Fig. 2 is an end elevation of the feeding mechanism and printing machine; Fig. 3 is a plan of the feeding mechanism; Fig. 4 is a vertical cross section through the feeding mechanism, as indicated by the line 4—4 on Fig. 3, the printing machine being illustrated by broken lines; Fig. 5 is a diagram in the nature of a section in the plane of Fig. 4 on an enlarged scale illustrating the action of the dislodging and discharging rollers; Fig. 6 is a left hand end view of the feeding mechanism; Fig. 7 is a side elevation of the wiping shaft with its wiping or dislodging segment; Fig. 8 is an end view of one of such segments; Fig. 9 is a vertical cross section substantially on the line 9—9 of Fig. 3 and showing the gearing for transmitting motion to the wiper shaft and the lower transmitting roller, this view looking in the left hand direction; Fig. 10 is a side elevation of the tapping shaft with its tapping fingers; Fig. 11 is an end view of such shaft and fingers.

Figs. 1, 2 and 3 illustrate a rotary printing machine consisting of a drum 11 mounted in a frame 12, a platen 13 coöperating with the drum, and a paper feed 17. The drum is shown as rotated by a crank 15 and communicates motion to the platen by means of a gear 16 on the drum and suitable gearing, not shown, in the platen. The paper feed also may be properly geared with the drum. It is to be understood that the printing machine may be of any suitable form, and, indeed, my feeding mechanism is adapted for use with machines other than printing machines, but the rotary machine of the multigraph type shown is a convenient one.

The printing machine is shown as standing on a base plate 20. Secured to the forward edge of this base plate is an open horizontal frame consisting of longitudinal bars 23 and 22, and end bars 21, which constitute the bed of my feeding mechanism. Resting on the end bars 21 of this bed are two cross plates 24 and 25, from the ends of which rise standards 26, 27 and 28, 29. These cross plates, with their standards, are, in use, clamped rigidly to the end bars 21 and form a frame for the feeding mechanism. The plates and standards, however, are adjustable toward and from each other and toward and from the printing machine, as hereinafter more fully explained, to provide for cards, envelops or other articles of different sizes. For convenience, in the following description I will use the term "card" as including any article which my machine is adapted to feed.

Journaled in the standards 26 and 27 is a cross shaft 30. This shaft carries rubber or elastic sections 31, the operation of which will be hereinafter described. Mounted on the shaft, so as to swing slightly about it, is the yoke frame 33, which rises approximately vertically from the shaft and is held in desired position by screws 34 (Fig. 2) passing through arcual openings 35 in the stationary standard 36 rising from the standards 26 and 27. The yoke 33 carries an approximately vertical plate 40, the lower portion of which is provided with separated fingers 41 which curve beneath the shaft 30 and between the sectional rolls 31 to form a guide, as hereinafter more fully explained.

The yoke frame 33 carries a cross rod 43. On this cross rod are slidably mounted bosses 44 extending from plates 45, which lie along the rear face of the plate 40, and are bent to form wings 46 providing side guides for the cards. The bosses are clamped on the rod 43 by set screws 48. The side guides, together with a rear approximately vertical guide-plate 50, carried by the standards 27 and 28, form an adjustable magazine, in which the cards to be fed are placed one above the other, as shown at A in Fig. 4.

When the cards are in the magazine, they stand in a substantially vertical pile, the lowermost card resting on a roller 52 journaled between the standards 27 and 28, near the rear end of the card, and beneath the incline of the guiding fingers 41 near the forward edge of the card. The lower portion of the stack of cards is kept in the fanned-out position shown in Fig. 4, by means of a series of tapping arms 55 mounted on a rock shaft 56, which is given a rapid oscillation to continually tap the cards.

The cards are dislodged one after the other from the bottom of the stack by the wipers 60 (Figs. 4, 7 and 8), which consist, as shown, of segments 61 mounted on a rotary shaft 62 and having a suitable wiping face, as, for example, the rubber face 63 held by clamping screws 64. The shaft 62 is constantly revolved in a left hand direction (Figs. 4 and 5), so that the under card is engaged near its forward edge and shoved forwardly. This movement is aided by the rotation of the feed roller 52, which is constantly revolving in a left hand direction and tends to keep the cards in the position shown in Fig. 4, but does not have force enough on the cards to dislodge any of them. When the card is dislodged by the segmental wiper, it slides forwardly along the table 65, until stopped by the abutment bar 69 extending along the front of the machine. The table 65 consists of a series of strips, like a grille, mounted on a cross bar 66 and extending forwardly over a rod 67, the forward ends of the grille arms being secured to a rod 68, for convenient construction.

The dislodging of the lowest card is caused not only by the wiping finger, aided by the feed roller 52, but also by the roller 70, which is mounted on a shaft 71 journaled in rock arms 72 rigid on a shaft 73 journaled at 74 in the standards 26 and 27. At the time the card is dislodged from the stack, the roller 70 is held down against a driving roller 75, which is constantly rotated in the right hand direction. This gives a left hand rotation to the roller 70. This aids in the forward drawing of the card, so that it is brought at once against the abutment 69. The roller 31 pushes back the cards adjacent to the lowest one which is being pushed forward by the wipers 63. This action insures the feeding of but one card at a time. After the dislodged card has come against the abutment 69, suitable mechanism swings the roller 70 upwardly from the roller 75 to pinch the card between itself and the roller 31. As the roller 31 is constantly driven in the left hand direction, and the roller 70 is not positively driven, the latter receives right hand rotation from the roller 31, and thus the card is pinched between these rollers and immediately fed rearwardly by their rolling coaction.

The axis of the roller 70 is somewhat forward of that radial plane of the roller 31, which is normal to the plane of the cards in the stack. Accordingly, the lowermost line of the roller 31 constitutes a fulcrum, about which the upward movement of the roller 70 turns the card, so that the rear portion of the card is flapped down onto the table 65. This movement is aided by the rotation of the roller 52. It is also aided by gravity acting on the card itself, and also, to some extent, slight bending of the forward portion of the card by the incline of the grille table. The result is that, just as soon as the roller 70 rises into coaction with the roller 31, the card is swung down at its rear end onto the table and is fed rearwardly by the rollers 70 and 31 so that the card passes between the roller 52 and a coöperating roller 82, bearing against its under side. This feeds the card rearwardly of the machine, so that it passes onto the printing machine, or whatever subsequent mechanism is to receive it.

As soon as the card dislodged and fed rearwardly by the means described has moved rearwardly past the wipers, they act upwardly on the next card and shove it forwardly. Accordingly, before one card has cleared the rollers 52 and 82, the next card has been fed forwardly into the grip of the rollers 31 and 70, and this card then starts rearwardly immediately after the preceding card. Thus the cards are dislodged from the bottom of the stack in rapid succession.

Power is conveyed to the various parts to cause them to act in proper time by the following described mechanism. On the printing drum shown is a gear 16, which forms a portion of the standard multigraph. This gear may be availed of to furnish the power for operating the card feed mechanism, as herein shown, or any other source of power may be employed. As shown in Figs. 1, 2 and 3, the gear 16 meshes with a spur gear 90, which is on a short shaft 92 journaled in a bearing in an end bracket 91 carried by the frame member 21. The shaft 92 carries a bevel gear 93 meshing with a bevel gear 94 on a diagonal fore-and-aft shaft 96. This shaft, near its rear end, is journaled in a yoke 97 pivotally mounted on the shaft 92. The shaft 96 passes forwardly through a yoke 100 pivoted on the shaft 30, and by an alined pivot to the bracket 103. Splined on the shaft 96 on the forward side of the yoke 100 is a bevel gear 101 meshing with a beveled gear 102 rigid on the shaft 30. The mechanism described conveys rotation from the printing drum to the upper feed roll 31, while enabling the adjustment of that roll toward or from the drum, as hereinafter further explained.

On the left hand end of the shaft 30 is a bevel gear 105, which meshes with a gear 106, splined on the shaft 107. This shaft is slidably journaled in the bracket 108, which is loosely journaled on the shaft 30. The rear portion of the shaft 107 is journaled in a bracket 110 loosely journaled on the shaft 53 of the roll 52, bevel gears 112 and 113 transmitting the motion. This construction enables a relative adjustment of the front and rear frame members of the feeding mechanism. The roll 52 on the shaft 53 transfers motion to the roll 82 on the shaft 83, by means of a gear 84 meshing with a gear 85 on the shaft 83. The latter roll is pressed toward the former roll by springs 120, mounted in boxes 121, in which the shaft 82 is journaled.

The wiper shaft 62 is rotated from the shaft 30 by gearing, such as shown in Fig. 9. That is to say, on the shaft 30 is a spur gear 125 meshing with a gear 126, journaled on a stud and having rigid with the gear a pinion 127, which meshes with a gear 128 on the wiper shaft 62. The same gear 128 is shown as meshing with a gear 129 on the shaft 76 of the roll 75, wherefore positive rotation is conveyed to that roll.

The roller 70 receives its motion in one direction or the other, according to whether it is bearing against the roller 31 or the roller 75. To swing the roller 70 from one position to the other, I mount on the rock shaft 73 a rock arm 130, Fig. 2, which carries a roller 131 coacting with a cam 132 on the wiper shaft 62. A suitable spring designated 133 keeps the roller 131 against the cam 132. The cam is properly proportioned to raise the roller 70 into pinching coaction with the roller 31. The down position of the roller 31 is regulated by its resting on the roller 75 against which it is drawn by the spring 133. An accurate adjustment is given to the down position of the rollers 70 by an eccentric bearing of the shaft 76 of the roll 75. The eccentric shaft 76 is locked in adjusted position by the set screw 145, Fig. 6, which screws through an arcual slot 146 in the standard 25 into an arm 147 on the shaft 76, and thus clamps that shaft in any desired angular position.

The tapping fingers 55 are shown as caused to constantly act against the rear edges of the card by the rocking of the shaft 56. This is accomplished by mounting on this shaft an arm 135, which carries a roller 136 coacting with a cam 137 on the shaft 53. The spring 138, Fig. 6, holds the cam normally in engagement.

The transmission of power by means of the pivotally hung shafts 96 and 107 described, and the bevel gears slidably mounted on those shafts, enables adjustment of either the front or rear frame of the card feeder, either toward or from the other, or toward or from the printing machine itself. It is desirable to have the fed card pass between the feed rolls 17 of the printing machine at the forward end just as the rear end is released by the advancing rolls 52 and 82. Here the card may be stopped by a stop 135 operated by the printing machine, until at the proper time relative to the rotation of the printing drum the stop finger releases it and the rollers 17 are brought together feeding the card to the printing machine. Accordingly, for wider cards or envelops, the rear frame 28, 29 should be adjusted farther forward—that is, farther from the printing machine feed 17—and the forward frame 26 and 27 should be not only shoved forward, but shoved an increased distance from the rear frame. The bevel gears splined on the hinged shafts, as described, provide for this.

To enable the convenient movement of the frames and the locking of them in desired positions, I hold them by four thumb screws, two on each frame at the respective ends thereof. Two thumb screws 140 on the forward frame and two thumb screws 141 on the rear frame extend through slots in the supporting arms 21, and suitable handle pieces on these thumb screws enable them to be turned by the operator's fingers, as desired.

The adjustment just described provides for taking care of various widths of cards. The feeding rollers are designed to take the maximum length of card desired, and, therefore, to accommodate varying lengths, it is only necessary to shove in or out the side plates 46 of the magazine. These plates, being shiftably mounted on the rod 43, not only provide for taking different lengths of cards, but may be positioned to bring them into different positions relative to the printing machine, so that the printing will be in proper position or registration on the card.

I have described the adjustment for different sizes of cards. The machine is adapted without change of adjustment to take care of various thicknesses or weights of material. Adjustment is provided, however, for such different weights, by reason of the eccentric adjustment of the roller 75, which limits the downward position of the rollers 70, and, by reason of the adjustment of the guard fingers 41, with reference to the roller 31. This guard, it will be noted, is, on its lower portion, eccentric of the shaft 30, so that the swinging of the magazine frame about the roller 31 causes the guard to move downwardly, or upwardly, relative to the active portions of the roller 31, the magazine frame being clamped by the thumb screws 34. By this adjustment the guard fingers may be so positioned relative to the thickness as to allow the passage of only one card, the rest being wiped back by the roller 31.

The adjustment is made of the guard 41 so that the feed roller 31 extends below it enough to pinch with the roller 70 when the latter is raised, but not enough to interfere with the forward feed of the card in its dislodgment from the stack. The roller 70 always projects above the top plane of the grille table 65, but the lowermost position of this roller is adjusted by the eccentric 76 with reference to the thickness of the cards so that only one at a time can pass between the roller 70 and the roller 31. These positions and adjustments are illustrated particularly in the diagram Fig. 5.

It will be seen that my feeding mechanism is simple and is easily adjustable, and is adapted for a wide variety of sizes and weights of cards, envelops, or other articles to be fed. Experience has demonstrated that it may feed these articles with great rapidity. Another advantage of the feeding mechanism described is the ease with which it may be coördinated with a printing machine of suitable type.

Having thus described my invention, what I claim is:

1. The combination of means for holding a supply of articles to be fed, a pair of rolls, means for feeding an article from the supply between the rolls in one direction, and means for thereafter causing the rolls to feed the article in the opposite direction between said rolls.

2. The combination of means for holding a supply of articles to be fed, a pair of separable rolls, means for feeding articles from the supply between the rolls while separated, and means for causing the rolls to pinch the article and feed it in the opposite direction.

3. The combination of means for holding a stack of articles to be fed, means adapted to engage the endmost article in the stack and shove it in one direction, a pair of rolls between which it passes on this movement, and means for causing such rolls to feed the article in the opposite direction between said rolls.

4. The combination of means for holding a stack of articles to be fed, means adapted to engage an article to shove it part way from the stack, a pair of separable rolls between which it is thus shoved, and means for bringing said rolls together to pinch the article and feed it in the opposite direction.

5. The combination of means for holding a stack of articles to be fed, a rotary wiper adapted to engage an article to shove it part way from the stack, a pair of rolls between which it passes, and means for causing the rolls to feed the article in the opposite direction between the rolls.

6. The combination, with means for holding a stack of articles to be fed, of a rotary wiper adapted to engage the endmost articles, a pair of separable rolls between which such articles may be forced by the wiper, and means for bringing the rolls together to pinch the article and feed it in the opposite direction.

7. The combination, with a magazine for cards, of a pair of rolls one higher than the other, the upper roll being adapted to engage and help support the lowermost card in the stack, means for rotating said rolls, means for dislodging the lowermost card by a movement in the same general direction as that in which the upper portion of the upper roll is moving, and means for feeding such dislodged card between said rolls.

8. The combination, with a magazine, of a pair of coacting rolls beneath it, the uppermost roll being adapted to engage the bottom card in the stack, a rotary wiper adapted to feed the bottom card in the stack forwardly, means for rotating the rolls in coaction, the upper roll having its upper part moving in the general direction in which the card moves under the influence of the wiper, whereby such roll assists the wiper, and means for forcing the dislodged card rearwardly to cause it to pass between such rolls.

9. The combination of separable rolls, means for feeding a card between them in a direction other than a right angle to the plane in which the axes of the rolls lie, and means for thereafter bringing such rolls together to swing the card nearer to a position tangent to both rolls at their point of contact.

10. The combination of separable rolls, means for feeding a card between them in a direction other than a right angle to the plane in which the axes of the rolls lie, means for thereafter bringing such rolls together to swing the card nearer to a position tangent to both rolls at their point of contact, and a pair of coacting rolls into the grip of which the card is passed after being so swung.

11. The combination of separable rolls, means for feeding a card between them in a direction other than a right angle to the plane in which the axes of the rolls lie, means for thereafter bringing such rolls together to swing the card nearer to a position tangent to both rolls at their point of contact, and a table against which the card is swung by such pinching action of the rolls.

12. The combination of separable rolls, means for feeding a card between them in a direction other than a right angle to the plane in which the axes of the rolls lie, means for thereafter bringing such rolls together to swing the card nearer to a position tangent to both rolls at their point of contact, a table against which the card is swung by such pinching action of the rolls, and a pair of coacting rolls having their line of contact adjacent to the paper, said rolls being adjacent to the rear end of the card which is swung against the table by the first mentioned rolls.

13. The combination, with a magazine for carrying a stack of cards, of a pair of separable members, means for feeding a card from the stack between said members, one of the members being offset from a plane normal to the card at the line of contact, and means for moving one of said members to swing the card about the other member.

14. The combination, with a magazine for cards to be fed, of a pair of separable rolls, means for feeding a card between said rolls, means for causing said rolls to coact to pinch the card and for rotating the rolls when in coaction in the direction to feed the card oppositely to its movement in coming between the rolls.

15. The combination, with a magazine, of a pair of separable rolls, means for dislodging a card from the magazine and feeding it between the rolls when separated, means for thereafter bringing the rolls into pinching coaction while they are rotating in a direction to feed the article oppositely to its original movement between the rolls, and means for receiving and advancing such fed card.

16. The combination of a magazine, a pair of separable rolls, a pair of contacting advancing rolls, the upper one of which contacts with the endmost card in the magazine, means for feeding such endmost card between the separable rolls while they are separated, means for then bringing the separable rolls into pinching coaction on the card, and means for rotating one of the separable rolls and one of the advancing rolls in the same direction.

17. The combination of a magazine for holding a stack of cards, a pair of advancing rolls, the upper one of which contacts with the lowermost card in the stack, means for continuously rotating said rolls in a forward direction at the stack and a rear direction at the line of contact, a roll adjacent to the front of the stack rotating in the same direction as the uppermost advancing roll, a bodily movable roll adapted to coact or be out of coaction with such front roll, and means for carrying the lowermost card in the stack beneath the said front roll and for thereafter causing the bodily movable roll to pinch the card between it and the front roll.

18. The combination of a magazine, a pair of coacting advancing rolls, a pair of separable rolls, one of the advancing rolls and one of the separable rolls being made sectional, a grille-like table having bars adapted to extend between such sections, means for dislodging a card from the stack and carrying it between the separable rolls, and means for causing said separable rolls to pinch the card and carry it rearwardly along the table into the bite of the advancing rolls.

19. The combination of a magazine, a pair of coacting advancing rolls, a pair of separable rolls, one of the advancing rolls and one of the separable rolls being made sectional, a grille-like table having bars adapted to extend between such sections, a series of wipers adapted to act between the bars of the grille table on a card in the stack and dislodge the same and carry it between said separable rolls, and means for thereafter causing said separable rolls to pinch the card between them and feed it rearwardly along the table.

20. The combination of a magazine for supporting articles to be fed, a grille like table, a series of wipers adapted to act through the openings in the table onto the endmost card in the stack, rolls between which such card is carried, and means for driving said rolls in the direction to shove the card rearwardly along the table.

21. The combination of a magazine for supporting articles to be fed, a grille-like table, a series of wipers adapted to act through the openings in the table onto the endmost card in the stack, rolls between which such card is carried, means for driving said rolls in the direction to shove the card rearwardly along the table, and a pair of advancing rolls adapted to receive between them the card shoved along the table, the upper of said advancing rolls acting against the endmost card in the stack and assisting in feeding it in a dislodging direction.

22. The combination, with a magazine, of a pair of advancing rolls, a table extending forwardly therefrom consisting of a series of parallel bars, a pair of shafts between which said table extends, rolls on said shafts, one of which rolls is sectional to extend between the bars of the table, a series of rotatable wipers adapted to extend between the bars of the table, and means for changing the position of the last mentioned rolls and the wipers relative to the table.

23. The combination of means for holding a supply of articles to be fed, a pair of rolls, means for feeding an article from the bottom of the supply between the rolls, a table, and means for stopping the progress of the article and for causing the rolls to feed the article from its stopped position in the opposite direction along the top of the table.

24. The combination of means for holding a supply of articles to be fed, a pair of separable rolls, means for dislodging and feeding articles from the supply between the rolls while separated, a grille-like table through which one of said rolls is adapted to project, and means for causing the rolls to pinch the article and feed it along the table in a substantially opposite direction from its dislodging movement.

25. The combination of means for holding a supply of articles to be fed, a pair of rolls one of which is sectional, a table composed of parallel bars extending between the roll sections, means for moving the rolls or table bodily to adjust one with reference to the other, and means for feeding articles from the supply between the rolls.

26. The combination, with a magazine for cards, of a pair of rolls one higher than the other, the upper roll being adapted to engage and help support the lowermost card in the stack, means for rotating said rolls, means for dislodging the lowermost card by a movement in the same general direction as that in which the upper portion of the upper roll is moving, a table adjacent to the line of contact between said rolls, and means for feeding such dislodged card rearwardly along the table and between said rolls.

27. The combination of separable rolls, one of which is sectional, means for feeding a card between such rolls in a direction other than a right angle to the plane in which the axes of the rolls lie, means for thereafter bringing such rolls together to swing the card nearer to a position tangent to both rolls at their point of contact, a table against which this card swings in such movement and which consists of a series of bars extending between said sections, and means for moving the separable rolls as a unit relatively to said table.

28. The combination of means for holding a stack of articles to be fed, a rotary wiper adapted to engage an article, a pair of rolls between which the article passes, an adjustable frame carrying the wiper and rolls, and advancing mechanism relative to which said frame is adjustable.

29. The combination, with a magazine, of a pair of coacting rolls beneath it, the uppermost roll being adapted to engage the bottom card in the stack, a rotary wiper adapted to feed the bottom card in the stack forwardly, means for rotating the rolls in coaction, the upper roll having its upper part moving in the general direction in which the card moves under the influence of the wiper, whereby such roll assists the wiper, and two independently relatively adjustable frames, one carrying said rolls and the other carrying the magazine and wiper.

30. The combination, with a magazine for cards to be fed, of a pair of separable rolls, means for feeding a card between said rolls, means for causing said rolls to coact to pinch the card and for rotating the rolls when in coaction in the direction to feed the card oppositely to its movement in coming between the rolls, and an adjustably positioned frame carrying the magazine, the rolls and the feeding means.

31. The combination, with a magazine, of a pair of separable rolls, means for dislodging a card from the magazine and feeding it between the rolls when separated, means for thereafter bringing the rolls into pinching coaction while they are rotating in a direction to feed the article oppositely to its original movement between the rolls, means for receiving and advancing such fed card, and independently adjustable frames, one carrying the receiving rolls and the other said separable rolls.

32. The combination of a magazine, a pair of co-acting advancing rolls, a pair of separable rolls, one of the advancing rolls and one of the separable rolls being made sectional, a grille-like table having bars adapted to extend between such sections, a series of wipers adapted to act between the bars of the grille table on a card in the stack and dislodge the same and carry it between said separable rolls, means for thereafter causing said separable rolls to pinch the card between them and feed it rearwardly along the table, and two independent mutually adjustable frames, one carrying the table and advancing rolls and the other the magazine and separable rolls.

33. The combination of means for holding a stack of articles to be fed, means adapted to engage the endmost article in the stack and shove it in one direction, a pair of rolls between which it passes, one of said rolls being sectional, guard fingers extending between the sections, and means for causing the rolls to feed the article in a direction opposite to its original movement.

34. The combination of means for holding a supply of articles to be fed, a pair of separable rolls, means for feeding an article from the supply between the rolls, means for causing the rolls to pinch the article, one of said rolls being sectional, a guard between adjacent sections extending eccentrically of such roll, and means for adjusting the guard about the axis of the roll.

35. The combination of means for holding a stack of articles to be fed, means adapted to engage an article to shove it part way from the stack, a pair of separable rolls between which it is thus shoved, means for bringing said rolls together to pinch the article and feed it in the opposite direction, one of said rolls being sectional, guards extending eccentrically of the roll, and means for adjusting such guards about the axis of the roll.

36. The combination, with a magazine, of two separated rolls rotating in opposite directions, a bodily movable intermediate roll adapted to coact with either of said rotated rolls, means for feeding an article from the magazine between one of such rotated rolls and the bodily movable roll while the bodily movable roll is in contact with the other of the rotated rolls, and means for thereafter moving the bodily movable roll to pinch the dislodged article between it and the first specified other rotated roll.

37. The combination of a magazine, two positively driven rolls rotating in opposite directions, a free roll mounted to shift in contact with either positively driven roll and partake of movement therefrom, means for feeding cards from the magazine between one of the driven rolls and the shiftable roll while the latter is in engagement with the other driven roll, means for thereafter shifting the shiftable roll into coaction with the first specified driven roll, and a pair of driven advancing rolls adapted to receive the card pinched and fed by the shiftable roll and the driven roll with which it coacts, as last mentioned.

38. The combination of a pair of separated rolls, means for continuously rotating them in opposite directions, an intermediate shiftable roll adapted to coact with either driven roll, means for feeding a card between the shiftable roll and one of the driven rolls in opposition to the direction of rotation of such driven roll, and means for thereafter bringing the shiftable roll into coaction with such driven roll to pinch the card between them and drive it in the reverse direction.

39. The combination, with a magazine, of two separated rolls rotating in opposite directions, a bodily movable intermediate roll, rock arms and a rock shaft carrying the same, whereby said intermediate roll is adapted to coact with either of said rotated rolls, means for feeding an article from the magazine between one of such rotated rolls and the intermediate roll while the latter is in contact with the other rotated roll, and a cam acting on the rock shaft to move the intermediate roll to pinch the dislodged article between it and the other rotated roll.

40. The combination of a pair of separated rolls, means for continuously rotating them in opposite directions, means for adjusting the axis of one of them, an intermediate shiftable roll adapted to coact with either driven roll, a spring tending to maintain such coaction with one roll, means for feeding a card between the shiftable roll and the other driven roll in opposition to the direction of rotation of such driven roll, and means for thereafter bringing the shiftable roll into coaction with such other driven roll to pinch the card between them and drive it in the reverse direction.

41. The combination of a magazine, two positively driven rolls rotating in opposite directions, a free roll mounted to shift into contact with either positively driven roll and partake of movement therefrom, a rotatable wiper for feeding cards from the magazine between one of the driven rolls and the shiftable roll while the latter is in engagement with the other driven roll, and means for thereafter shifting the shiftable roll into coaction with the first specified driven roll.

42. The combination of means for holding a stack of articles to be fed, a rotary wiper adapted to engage an article to shove it part way from the stack, a pair of separated rolls between which it passes, means for bodily shifting one of said rolls to pinch the article, and a tapper adapted to keep the articles fanned out.

43. The combination, with means for holding a stack of articles to be fed, of a wiper adapted to engage the endmost article, a pair of separable rolls between which such article may be forced by the wiper, a vibrating tapper tending to keep the articles near the end of the stack fanned out toward one of said rolls, and means for bringing the rolls together to pinch the article and feed it in the opposite direction.

44. The combination, with means for supporting cards in a stack, of means for dislodging the bottom card from the stack, a roll, the upper portion of which assists in supporting the cards in the stack, and a vibrating tapper to keep the cards near such roll fanned out.

45. The combination of a magazine for carrying a stack of cards, a vibrating tapper adapted to keep cards near the end of the stack fanned out, a pair of separable members adjacent to the other end of the cards so fanned out, means for feeding a card from the stack between said members, one of the members being offset from a plane normal to the card at the line of contact, and means for moving one of said members to swing the card about the other member.

46. The combination of a magazine for cards to be fed, a vibrating tapper at the rear of the cards, a pair of separable rolls at the front of the cards, means for feeding a card between said rolls, and means for causing said rolls to coact to pinch the card and for rotating the rolls when in coaction in the direction to feed the card oppositely to its movement in coming between the rolls.

47. The combination of a magazine, a pair of rolls, a wiping device to move a card from the magazine between the rolls, an adjustable frame on which all of such parts are mounted, a pair of advancing rolls, and an independently adjustable frame on which the advancing rolls are mounted.

48. The combination of a magazine, a pair of rolls and a dislodging device, an adjustable frame on which all of such parts are mounted, and an extensible driving connection for driving the rolls and dislodging device.

49. The combination, with a printing machine, of a card feeding mechanism comprising a magazine, dislodging and feeding mechanism and advancing rolls, and driving connections between the printing mechanism and the parts mentioned enabling an independent adjustment of the dislodging mechanism and the advancing rolls.

50. The combination, with a printing machine, of a magazine, dislodging mechanism, an adjustable frame carrying the dislodging mechanism, a shaft geared with the printing machine, and gearing including a shaft and a slidable bevel gear between the shaft first mentioned and the dislodging mechanism.

51. The combination, with a magazine for cards, of dislodging and feeding mechanism carried thereby, advancing rolls for the dislodged and fed card, independently adjustable frames carrying the mechanism and the advancing rolls, an extensible driving connection between the feeding mechanism and the advancing rolls, and another extensive driving connection to the feeding mechanism.

52. The combination, with a rotary printing machine having a gear, of a card feeding mechanism having independently adjustable feeding rolls and advancing rolls, extensible gearing from the gear on the printing mechanism to one set of said rolls, and gearing between such rolls and the other set of rolls.

53. In a feeding mechanism, the combination of a bed, a pair of cross plates adjustably mounted thereon, a pair of advancing rolls carried by one cross plate, and a magazine, feeding rolls and a dislodging device carried by the other cross plate.

54. In a feeding mechanism, the combination of a bed, a pair of cross plates adjustably mounted thereon, a pair of advancing rolls carried by one cross plate, a magazine, feeding rolls and a dislodging device carried by the other cross plate, combined with a printing machine having a gear, and gearing between said gear and the respective rolls.

55. The combination, with a frame, of a pair of cross plates mounted thereon, clamping screws for holding said plates in adjusted position on the frame, a pair of advancing rolls carried by standards rising from one plate, feeding rolls and a dislodging device carried by standards rising from the other plate, and a table carried by one set of standards and extending between the rolls of the other set.

56. The combination of a bed, a pair of mutually adjustable frames carried thereby, a magazine, feeding rolls and a rotary wiper carried by one frame, advancing rolls, and a tapper carried by the other frame, one of said advancing rolls and a tapper being adapted to act on the cards in the magazine.

57. The combination of a pair of feeding rolls, a frame adjustable about the axis of one of said rolls, a magazine carried by said frame and comprising side plates adjustable laterally, and means for feeding the lowermost card in the magazine between said rolls.

58. The combination of means for holding a stack of articles to be fed, means adapted to engage the endmost article in the stack and shove it in one direction, a pair of rolls between which it passes on this movement, one of said rolls acting to brush back the cards adjacent to the one being fed, and means for causing such rolls to feed the article in the opposite direction.

59. The combination with means for supporting cards in a stack, a pair of bodily separable rolls, and means for feeding the endmost card from the stack between the rolls, one of said rolls being adapted to brush back the cards adjacent to the one being fed, and means for causing said rolls to pinch and thereby feed the article.

60. The combination of means for holding a supply of articles to be fed, a pair of separable rolls, means for feeding articles from the supply between the rolls while separated, means for keeping the cards fanned out adjacent one of the rolls, said roll acting to push back all the cards except the endmost one, and means for causing the rolls to pinch the article and feed it.

61. The combination of means for holding a supply of articles to be fed, a pair of bodily separable rolls, means for feeding an article from the supply between the rolls, means for causing said rolls to pinch and thereby feed the article, one of said rolls being sectional, a guard between adjacent sections extending eccentrically of such roll, said roll acting to push back the articles adjacent the guard, and means for adjusting the guard about the axis of the roll.

In testimony whereof, I hereunto affix my signature in the presence of two witnesses.

GEORGE T. TRUNDLE.

Witnesses:
GERTRUDE K. SMITH,
ELSIE WENDELL.